May 23, 1933.  A. O. AUSTIN  1,910,228
CAPACITANCE TAP FOR INSULATORS
Filed June 28, 1929
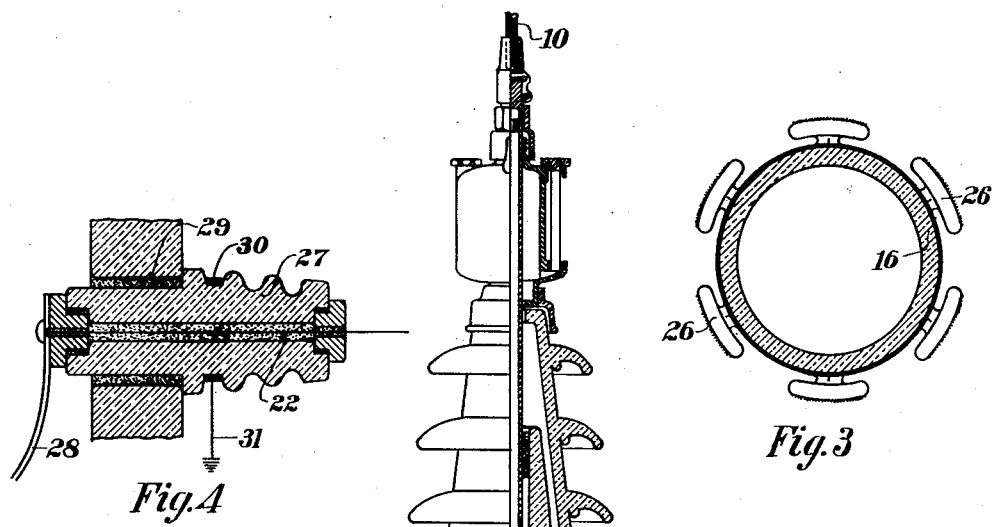
INVENTOR
Arthur O. Austin,
BY *Alpheus J. Crane*
ATTORNEY Patented May 23, 1933

1,910,228

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

CAPACITANCE TAP FOR INSULATORS

Application filed June 28, 1929. Serial No. 374,558.

This invention relates to means for utilizing the capacitance of a bushing insulator for diverting energy from the current passing through the conductor extending through the bushing.

The invention has for one of its objects the provision of a capacitance tap for an insulator which shall be simple and economical to apply to a bushing without impairing the efficiency of the bushing and without requiring material changes in the size or structure thereof.

A further object is to provide a capacitance tap for bushing insulators which shall be of improved construction and operation.

Other objects and advantages will appear from the following description.

The invention is exemplified in the combination and arrangement of parts shown in the accompanying drawing and described in the following specification, and it is more particularly pointed out in the appended claims.

In the drawing:

Fig. 1 is an elevation with parts in section showing one embodiment of the present invention.

Fig. 2 is an enlarged section showing detail of construction.

Fig. 3 is a horizontal sectional view of a modified form of baffle and support therefor.

Fig. 4 is an enlarged fragmentary sectional view showing another detail.

Fig. 5 is a fragmentary, diagrammatic, vertical, sectional view of a modified detail.

It is very desirable to provide for a large volt ampere output from bushings provided with a capacitance tap. In apparatus of this kind, the electrostatic capacity of the bushing may be utilized for synchronizing, relay operation or, in fact, any operation that can be produced by means of electrostatic coupling, provided sufficient energy is available. In order to provide sufficient volt ampere capacity, it is necessary that there be an appreciable difference in voltage between the condenser plates, to which the capacitance tap is applied, and ground. The available energy will increase approximately as the square of the voltage between the capacitance plate and ground, and directly as the electrostatic capacity between the capacitance plate and the conductor passing through the bushing. Where the operating voltages are very high, the large thickness of dielectric between the plates forming the condenser lowers the electrostatic capacity. While the electrostatic capacity may be increased by increasing the area of the plates, this method of obtaining a large capacitance can only be used to a limited extent as the size of the bushing will be increased for a given arcing voltage.

In the form of the invention shown in Fig. 1, a high voltage entrance bushing, suitable for oil circuit breaker or transformer work, has a lead 10 and a mounting flange 11. The upper portion has an insulating cone 12 with weather sheds 13. The lower part of the bushing is provided with an insulating sleeve or member 14. The space 15 inside the shell is usually filled with oil or an insulating compound. The main outer insulating baffle 16 is provided with metalized surfaces or conducting plates 17 and 18. These metalized surfaces or plates form a condenser with the lead 10 passing through the bushing. It is customary to support the insulating baffle by a metal flange 19. This flange is cemented, clamped, or otherwise attached to projecting ring 20 which is preferably integral with the insulating baffle 16. The flange 19 is T-shaped in cross section, the flat horizontal stem portion being gripped between the two porcelain bells 12 and 14 making up the insulator housing. With the construction shown, the charged surfaces 17 and 18 are spaced an appreciable distance from the metallic parts on the outside of the bushing and from the flange 19 which are at ground potential. This reduces the electrostatic capacity between the capacitance plates 17 and 18 and ground, thereby making a larger portion of the electrostatic energy available than where grounded surfaces are brought nearer to the capacitance plate. It is evident that any path between the plates 17 and 18 to ground is a shunt path.

With the construction described, it is possible to develop a rather high voltage between the capacitance tap and ground without affecting the efficiency or carrying voltage of the bushing. By utilizing a transformer in the capacitance tap as shown in my prior Patent 1,709,826, the high voltage available may be converted into a considerably larger current at a lower voltage so as to give a relatively high voltage ampere output in available form even though the capacitance of the bushing is small. Since there must be an appreciable difference in potential between the capacitance plates 17 and 18 and ground, it is necessary to bring out a tap or lead from the capacitance plate which is insulated from ground. Such a tap is shown at 21 on the lower insulating shell or at 22 for the upper insulating shell. The bushing for the capacitance tap 21 is preferably recessed in the outer shell 14 so as to be substantially flush with its outer surface. This permits the lower portion of the bushing to be passed through current transformers without increasing the internal diameter of such transformers. The lead 21 must be insulated from ground and for this purpose may be passed through a bushing 23 in the flange 11. Generally, a by-pass gap to ground is provided, similar to that shown in my previous Patent, Number 1,709,826. Where only a small electrostatic capacity is required, the condenser surface 17 or 18 alone may be used and the other one connected to ground through the metal supporting flange 18. Generally, however, a large available capacitance is desirable and the two capacitance plates 17 and 18 are coupled together through a connecting conductor 24 or through the external leads 21 and 22.

An enlarged section showing the supporting flange 19 and the insulating flange 20 is shown in Fig. 2. The metal supporting flange 19 is cemented to the supporting flange 20 by cement 25. The flange 20 projects from the main body 16 and is preferably an integral part of same. The flange 20 generally is a continuous annular member although it need be only of sufficient length to provide the necessary mechanical support. In order to avoid the necessity of bringing out both leads 20 and 21, the two conducting surfaces 17 and 18 may be connected by a lead 24 which may be passed through an opening in the wall between the insulating flange 20 and the main body 16. With this arrangement, the full capacitance of the internal electrostatic screen may be developed. The insulating flange 20 need not be continuous and may be made of separate insulating members 26, as shown in Fig. 3. Where the insulating tap is exposed to the weather, it may be advisable to provide an insulator member 27 which extends some distance from the surface of the housing 12. This may be made up of a portion of the insulating shell 12 or be made up in any suitable manner which will develop the necessary insulation between the outgoing lead 21 and the remainder of the insulating shell and ground. Where a capacitance tap is placed above the flange 11, as at 22, the lead 22 may be protected from leakage currents, due to leakage of the bushing or a discharge, by placing a grounded shield or guard ring between the tap and the leakage path over the bushing. This arrangement is shown best in Fig. 4. The lead 22 passes through an extension bushing 27 so as to make an oil tight joint and is provided with a spring contact 28 which will make contact with the capacitance plate 17. The bushing 27 may be cemented to the shell 12 by means of a joint 29 or, if desired, one of the clamping type bushings may be used. In order to prevent a leakage current from affecting the charge on the lead 22, a ground or guard ring 30 is placed around the bushing and grounded by a lead 31. If desired, a guard ring or band 32 may be placed entirely around the bushing 12 and grounded in the same way by a lead 33. This guard ring 32 would, of necessity, have to be between the tap and one of the terminals of the bushing. Instead of bringing the lead 21 outside of the housing, an arrangement shown in Fig. 5 may be employed in which a transformer having a core 35 is mounted within the housing and supported from the top plate 36 of the housing in any suitable manner, as by brackets 37. The primary winding 38 is connected by a lead 39 and spring contact 40 to a contact 41 connected with the capacitance plate 18. The opposite end of the winding 38 is grounded by a lead 42. The lead 39 extends upwardly through a bushing 43 and is provided with an arcing gap 44 to ground. Any number of secondary windings 45 may be provided which are connected to leads 46, carried out through bushings 47. The leads 46 may be connected in any suitable manner to give any combination of the secondary windings 45 desired, so that the desired ratio of voltage and current may be obtained for any particular operation. The bushings 43 and 47 may all be mounted in a cover plate 48 which is removably secured to the top wall 36 of the housing.

It is evident that the magnetizing or leakage current in the step-down transformer attached to the capacitance tap has a lagging component. Hence, if a condenser is attached to a winding of this transformer, it will supply leading current and tend to offset the lagging component of the magnetizing current of the transformer, where the condenser is of proper capacitance. This condenser or phase changer may be placed across the secondary of the step-down transformer, as at 50; or, on a special winding, as at 51; or, across a portion of the primary winding, as at 52. If the condenser is placed across turns at the high voltage end of the primary winding of the step-down transformer, as at 53, it will tend to protect the end turn from a high voltage. When applied in this manner, the condenser will have sufficient capacitance for the turns to which it is connected, but will have a low capacitance to ground so as not to materially affect the voltage and current tending to magnetize the transformer.

With this construction, it is possible to operate the capacitance plate at a relatively high voltage to ground without lowering the efficiency of the bushing, owing to the reduced shunt capacitance between the capacitance plate and ground. A high volt ampere output may be obtained as compared to the usual design of bushings. The capacitance tap may be brought out through a suitably insulated lead at the junction of the flanges clamping the two parts together or through one of the metal flanges, if desired.

I claim:

1. A bushing insulator comprising a pair of dielectric bells having their open ends confronting each other to form a closed housing, flanges secured to said bells respectively for holding said bells together, a metallic member secured to said flanges and extending between the edges of said bells into said housing, a conductor extending through said insulator, a dielectric baffle surrounding said conductor and having a support of dielectric material projecting outwardly therefrom and secured to said metallic member for holding said baffle in position within said insulator and for spacing said baffle inwardly from said metallic member, and a capacitance member disposed outside of said baffle adjacent the outer surface thereof.

2. An insulator bushing comprising a dielectric housing, a conductor extending through said housing, a tubular dielectric baffle surrounding said conductor and having a dielectric supporting flange extending from the outer periphery thereof, means secured to the outer portion of said flange for supporting said baffle within said housing and spaced inwardly from the outer wall thereof, a capacitance member disposed about the outer surface of said baffle, and a lead electrically connected with said capacitance member and extending outside of said housing.

3. An insulator bushing comprising a dielectric housing, a conductor extending through said housing, a dielectric baffle surrounding said conductor, a dielectric flange extending outwardly from the outer surface of said baffle and having a head thereon forming a peripheral groove or pocket between said head and the outer surface of said baffle, means engaging said flange for supporting said baffle in said bushing, and a capacitance member disposed about said baffle and having the edge thereof extending into said pocket.

4. An insulator bushing comprising a dielectric housing, a conductor extending through said housing, a tubular dielectric baffle surrounding said conductor, a dielectric flange projecting from said baffle between the ends thereof, means engaging said flange for supporting said baffle within said housing, capacitance members of conducting material surrounding said baffle at opposite sides of said supporting flange, and a tap electrically connected with said capacitance members and extending outside of said housing.

5. An insulator bushing comprising a dielectric housing, a conductor extending through said housing, a tubular dielectric baffle surrounding said conductor and having a radially projecting flange between the ends thereof, said flange having a T-head thereon forming peripheral grooves about said baffle, conductor plates surrounding said baffle at opposite sides of said T head and having their adjacent edges extending into said peripheral grooves respectively, means secured to the outer portion of said T head for supporting said baffle within said housing, and a tap electrically connected with said conductor plates and extending outside of said housing.

6. An insulator bushing comprising a dielectric housing, a conductor extending through said housing, a tubular dielectric baffle surrounding said conductor and having a flange extending outwardly therefrom, a grounded support for said bushing disposed outside of said housing, a metallic member electrically connected to said grounded support and extending into said housing and secured to said flange for supporting said baffle, conductor coverings for the outer surface of said baffle disposed at opposite sides of said flange, said flange having a T head thereon forming peripheral grooves into which the inner edges of said conductor coverings extend, said baffle having inwardly directed flanges thereon extending backwardly about the outer edges of said conductor coverings, and a tap secured to said conductor coverings and extending outside of said housing.

7. An insulator bushing comprising a dielectric housing, a conductor extending through said housing, a tubular dielectric baffle surrounding said conductor and having a radially extending flange projecting from the outer surface thereof, said flange having a T head thereon forming peripherally extending grooves at opposite sides of said flange between said head and the outer surface of said baffle, conductor coverings disposed about said baffle at opposite sides of said flange, said flange having a perforation through the web thereof, a jumper extending through said perforation for connecting the conductor coverings at opposite sides of said flange, means secured to said T head for supporting said baffle, and a tap electrically connected with said conductor coverings and extending outside of said housing.

8. An insulator bushing comprising a pair of bell shaped dielectric members having their open ends confronting each other to form a closed housing, metallic flanges connected to said bells and secured together, a conductor extending through said housing, a tubular dielectric baffle surrounding said conductor within said housing, said baffle having a flange extending outwardly from the outer surface thereof and provided with a T head forming a peripheral pocket extending around said baffle, a metallic support clamped between said metallic flanges and extending into the interior of said housing and connected with said T head for supporting said baffle within said housing, metallic coating disposed on the outer surface of said baffle at opposite sides of the flange on said baffle and extending into the pockets formed by said T head, and inwardly directed flanges on said baffle overlying the outer edges of said metallic coating.

9. An insulator, a grounded support for said insulator, a conductor carried by said insulator, a tap extending from the surface of said insulator and a grounded guard member disposed upon the surface of said insulator between said conductor and said tap for diverting leakage currents on the surface of said insulator away from said tap to ground.

10. In combination a bushing insulator, a conductor extending through said insulator, a grounded support for said insulator, a tap extending through the wall of said insulator between one terminal of said insulator and said grounded support, and a grounded guard member interposed on the surface of said insulator between said tap and said terminal for diverting leakage currents, to ground, away from said tap.

11. A bushing insulator, a conductor extending through said insulator, means disposed within said insulator for diverting energy from said conductor, a tap extending through the wall of said insulator at one side of said grounded support and electrically connected with said energy diverting means, and a grounded guard member disposed on the surface of said insulator between said tap and the terminal for said insulator at the side of said tap away from said grounded support.

In testimony whereof I have signed my name to this specification this 10th day of June, A. D. 1929.

ARTHUR O. AUSTIN.